United States Patent [19]

Stoner et al.

[11] Patent Number: 4,746,585
[45] Date of Patent: May 24, 1988

[54] COMB-TYPE BIPOLAR STACK

[75] Inventors: Edward Stoner, Greensboro, N.C.; William F. Klems, Royal Oak, Mich.; Paul S. Sapienza, Greensboro, N.C.

[73] Assignee: Energy Development Associates, Inc., New York, N.Y.

[21] Appl. No.: 849,001

[22] Filed: Apr. 7, 1986

[51] Int. Cl.[4] .................. H01M 4/86; H01M 10/36
[52] U.S. Cl. ............................... 429/67; 429/27; 429/105; 429/234; 429/161
[58] Field of Search ............... 429/27, 38, 39, 51, 429/101, 105, 210, 67, 234

[56] References Cited

U.S. PATENT DOCUMENTS

| | | | |
|---|---|---|---|
| 3,713,888 | 1/1973 | Symons | 136/6 |
| 3,809,578 | 5/1974 | Symons | 136/6 |
| 3,909,298 | 9/1975 | Carr | 136/86 |
| 4,100,332 | 7/1978 | Carr | 427/27 |
| 4,518,664 | 5/1985 | Whittlesey et al. | 429/38 |

OTHER PUBLICATIONS

EPRI Interim Report, Section 16, Apr. 1979, of Development of the Zinc-Chlorine Battery for Utility Applications.
EPRI Interim Report, Sections 15 and 29, May 1980, of Development of the Zinc-Chloride Battery for Utility Applications.

Primary Examiner—Donald L. Walton
Attorney, Agent, or Firm—Harness, Dickey & Pierce

[57] ABSTRACT

An improved design for an intermediate bus bar for a comb-type cell for a metal-halogen battery system is disclosed. A plastic frame is formed around the periphery of a dense graphite bus bar and has a plurality of straps extending between the top and bottom section of the frame for reinforcing the structural integrity of the bus bar.

14 Claims, 1 Drawing Sheet

COMB-TYPE BIPOLAR STACK

The present invention relates generally to electrochemical systems, and particularly to an improved frame design for electrodes in a metal-halogen battery stack.

BACKGROUND AND SUMMARY OF THE INVENTION

Electrochemical devices or systems of the type referred to herein include one or more of the metal-halogen battery systems, such as a zinc-chloride battery system. These metal-halogen battery systems generally are comprised of three basic components, namely an electrode stack section, an electrolyte circulation subsystem, and a store subsystem. The electrode stack section typically includes a plurality of cells connected together electrically in various series and parallel combinations to achieve a desired operating voltage and current at the battery terminals over a charge/discharge battery cycle. Each cell is comprised of a positive and negative electrode which are both in contact with an aqueous metal-halide electrolyte. The electrolyte circulation subsystem operates to circulate the metal-halide electrolyte from a reservoir through each of the cells in the electrode stack in order to replenish the metal and halogen electrolyte ionic components as they are oxidized or reduced in the cells during the battery cycle. In a closed, self-contained metal halogen battery system, the storage subsystem is used to contain the halogen gas or liquid which is liberated from the cells during the charging of the battery system for subsequent return to the cells during the discharging of the battery system. In the zinc-chloride battery system, chlorine gas is liberated from the positive electrodes of the cells and stored in the form of chlorine hydrate. Chlorine hydrate is a solid which is formed by the store subsystem in a process analogous to the process of freezing water where chlorine is included in the ice crystal.

With reference to the general operation of a zinc-chloride battery system, an electrolyte pump operates to circulate the aqueous zinc-chloride electrolyte from a reservoir to each of the positive or "chlorine" electrodes in the electrode stack. These chlorine electrodes are typically made of porous graphite, and the electrolyte passes through the pores of the chlorine electrodes into a space between the chlorine electrodes and the opposing negative or "zinc" electrodes. The electrolyte then flows up between the opposing electrodes or otherwise out of the cells in the electrode stack and back to the electrolyte reservoir or sump.

During the charging of the zinc-chloride battery system, zinc metal is deposited on the zinc electrode substrates and chlorine gas is liberated or generated at the chlorine electrode. The chlorine gas is collected in a suitable conduit, and then mixed with a chilled liquid to form chlorine hydrate. A gas pump is typically employed to draw the chlorine gas from the electrode stack and mix it with the chilled liquid, (i.e., generally either zinc-chloride electrolyte or water). The chlorine hydrate is then deposited in a store container until the battery system is to be discharged.

During the discharging of the zinc-chloride battery system, the chlorine hydrate is decomposed by permitting the store temperature to increase, such as by circulating a warm liquid through the store container. The chlorine gas thereby recovered is returned to the electrode stack via the electrolyte circulation subsystem, where it is reduced at the chlorine electrodes. Simultaneously, the zinc metal is dissolved off of the zinc electrode substrates, and power is available at the battery terminals.

Over the course of the zinc-chloride battery charge/discharge cycle, the concentration of the electrolyte varies as a result of the electochemical reactions occurring at the electrodes in the cells of the electrode stack. At the beginning of charge, the concentration of zinc-chloride in the aqueous electrolyte may typically be 2.0 molar. As the charging portion of the cycle progresses, the electrolyte concentration will gradually decrease with the depletion of zinc and chloride ions from the electrolyte. When the battery system is fully charged, the electrolyte concentration will typically be reduced to 0.5 molar. Then, as the battery system is discharged, the electrolyte concentration will gradually swing upwardly and return to the original 2.0 molar concentration when the battery system is completely or fully discharged.

Further discussion of the structure and operation of zinc-chloride battery systems may be found in the following commonly assigned patents: Symons U.S. Pat. No. 3,713,888 entitled "Process For Electrical Energy Using Solid Halogen Hydrates"; Symons U.S. Pat. No. 3,809,578 entitled "Process For Forming And Storing Halogen Hydrate In A Battery"; Carr et al. U.S. Pat. No. 3,909,298 entitled "Batteries Comprising Vented Electrodes And Method of Using Same"; Carr U.S. Pat. No. 4,100,332 entitled "Comb Type Bipolar Electrode Elements And Battery Stack Thereof"; Whittlesey et al. U.S. Pat. No. 4,518,664 entitled "Comb-Type Bipolar Stack". Such systems are also described in published reports prepared by the assignee herein, such as "Development of the Zinc-Chloride Battery for Utility Applications", Interim Report EM-1417, May 1980, and "Development of the Zinc-Chloride Battery for Utility Applications", Interim Report EM-1051, April 1979, both prepared for the Electric Power Research Institute, Palo Alto, Calif. The specific teachings of the aforementioned cited references are incorporated herein by reference.

The present invention is directed to an improved comb-type bipolar electrode stack construction, and is particularly directed to an improved intermediate bus bar construction within the comb-type bipolar stack constructions, for electrochemical systems having circulating electrolyte, which are particularly advantageous in zinc-chloride battery systems. Prior comb-type bipolar stacks for zinc-chloride battery systems have included intermediate bus bars for receiving the chlorine and zinc electrodes which are generally supported only at the periphery. Such structures are disclosed in the commonly assigned Carr et al. U.S. Pat. No. 4,100,332 and Whittlesey et al. U.S. Pat. No. 4,518,664, which have been previously incorporated by reference. This latter patent illustrates battery stack configurations which are based upon either an "open" top submodule design or a "closed" top submodule design. In the closed top submodule design, the submodules themselves are sealed, and therefore they will be directly subject to the various pressure levels at which the battery stacks operate during a charge/discharge cycle.

Since the stack area of a zinc-chloride battery may operate under a vacuum during one portion of a charge/discharge cycle and under pressure during another portion of this cycle, it should be appreciated that the bus bars in a closed top submodule design will be subject to the stress induced by these pressure levels (e.g. +/−10 psig). This pressure-induced stress could cause the intermediate bus bars to slightly bow or deform, and eventually such stress could lead to structural cracks along the edges of the bus bars where the plastic frame provides support for the bus bar. Since it is possible for a structural crack in the bus bar to compromise the electrolyic separation between the cells, and thereby adversely affect the efficiency of these cells, it would be advantageous to find an economic way to provide further support for the intermediate bus bars, particularly in connection to the closed top submodule design. Additionally, even slight elastic deformation or bowing along the length of the bus can cause deformation of the electrodes supported by the bus which may result in alteration of the inter-electrode gap and alteration of the cell geometry, thereby adversely affecting the performance of the cell.

Furthermore, stressful conditions are also created for the zinc-chloride battery bus bars when the porous graphite electrodes in the cell assemblies undergo an "activation" process to decrease the oxidation and reduction chlorine overvoltages of these electrodes. A detailed discussion of typical activation processes may be found in the following commonly assigned patents: Hart U.S. Pat. No. 4,120,774 entitled "Reduction of Electrode Overvoltage"; Laetham et al. U.S. Pat. No. 4,273,839 entitled "Activating Carbonaceous Electrodes". The specific teachings of these references are hereby incorporated by reference. Due to the nature of these activation processs, cell structures containing porous graphite electrodes are placed in a substantially more stressful environment than encountered during normal battery operation.

Accordingly, it is a principal objective of the present invention to provide an improved bus bar design for an electrode cell design which is subject to pressure and/or vacuum during a charge/discharge cycle.

It is a more specific object of the present invention to provide an intermediate bus bar structure which is reinforced for increased mechanical strength.

It is an additional object of the present invention to provide a reinforced intermediate bus bar structure for a zinc-chloride battery system which may readily be employed in a comb-type cell element providing the basic building block for constructing closed top submodule electrode stacks.

It is another object of the present invention to provide a reinforced intermediate bus bar structure which can more easily withstand an activation process.

It is an objective of the present invention to provide a reinforced intermediate bus bar frame design for a bus bar which physically supports electrodes placed therein, reducing deformation of the bus bar and to maintain a desired inter-electrode gap.

It is another objective of the present invention to provide a reinforced bus bar frame design which may be injection molded to enhance manufacturability and assembly of the battery stack.

To achieve the foregoing objects, the present invention generally comprises an intermediate bus bar structure and a plastic frame which is reinforced with vertical straps. In a preferred embodiment of the invention, grooves are provided in the bus bars to hold the straps flush to the faces of the bus bars, and the straps are preferably molded into these grooves during the molding of the frame around the bus bar. The straps which are provided at one or more locations along the length of the bus member improve the structural integrity of the bus member.

Additional advantages and features for the present invention will become apparent from a reading of the detailed description of the preferred embodiments which make reference to the following set of drawings.

DETAILED DESCRIPTION OF THE PREFERRED EMBODIMENT

Figure 1:
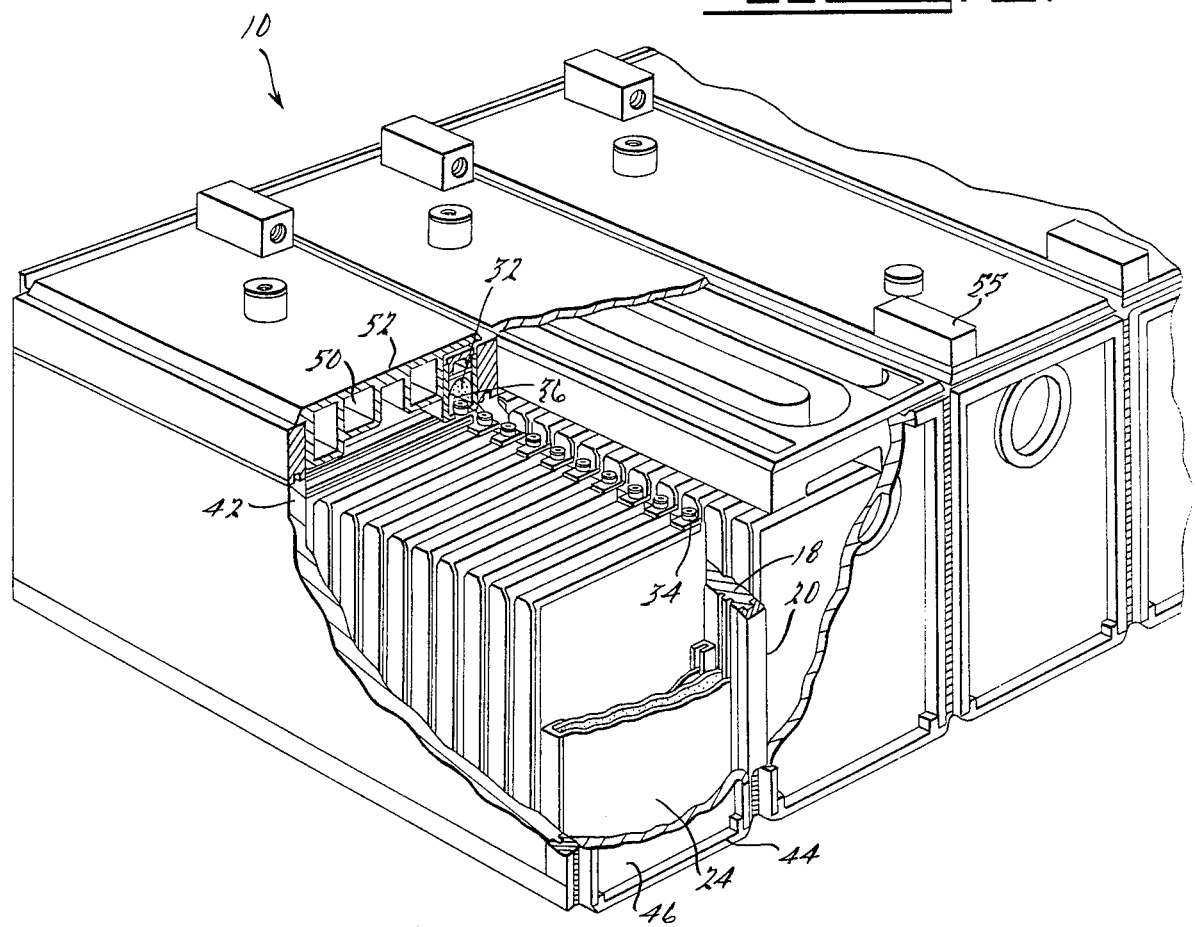
FIG. 1 is a cutaway perspective view of a closed top cell submodule shown for a zinc-chloride battery stack.

Referring to FIG. 1, a cutaway perspective view of a "closed" top submodule 10 for a zinc-chloride battery stack is shown. The submodule 10 generally comprises a zinc termination comb assembly, a chlorine termination comb assembly, and a plurality of bipolar intermediate comb assemblies. The intermediate comb assembly receives, on its opposing faces, a series of positive electrodes and a series of negative electrodes which will interdigitate with the opposite electrodes of the termination comb assemblies or other intermediate comb assemblies, as illustrated in FIG. 1.

Figure 2:
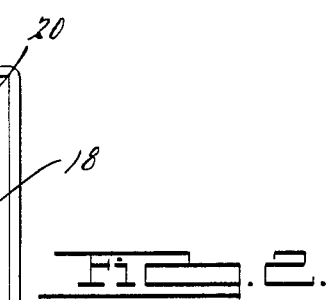
FIG. 2 is a side view of an intermediate bus bar assembly employed in the submodule shown in FIG. 1.
Figure 3:
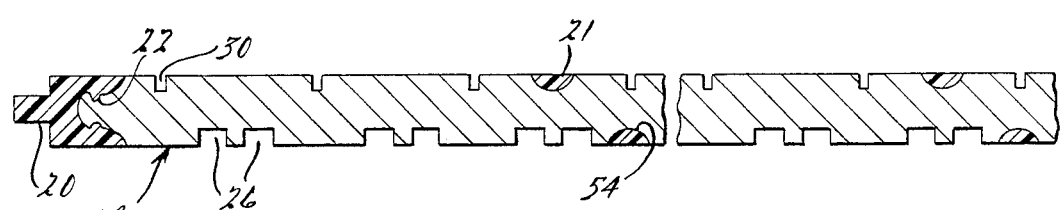
FIG. 3 is a cross-sectional view of the bus bar assembly shown in FIG. 2 taken along the line 4—4.

As shown in FIGS. 1–3, the intermediate comb assembly, includes an electrically conductive bus member 18 (i.e. constructed from dense graphite) which has two generally planar opposing faces and a plastic frame 20 generally disposed around the periphery or circumference of the bus member. The frame 20 contains a plurality of vertically extending support straps 21 which are preferably simultaneously formed with the frame 20 by injection molding PVC about the edges of bus member 18. A pair of opposed longitudinally extending grooves 22 may be used to provide a mechanical interlock between this PVC encapsulation and the edges of bus member 18. A plurality of positive electrode structures 24 are attached via a press or interference fit connection to one exterior face of the bus member 18, which is provided with spaced vertical grooves 26, while a plurality of negative electrodes are attached to the other face of the bus member in a similar fashion into spaced vertical grooves 30. It should be noted that these electrode structures are laterally staggered to permit the interdigitation of adjacent comb-type cell elements in the electrochemical system.

The bus bar 18 provides the structural support for the electrodes and provides fluid separation between cells. The structural support provided by the bus bar 18 and the electrodes also tends to restrain any deformation of the electrodes, and to insure that the desired inter-electrode gap between the positive and negative electrodes is maintained. The integrity of this inter-electrode gap is important because it has been found that with increased gaps on the order of 129 mils the electrical current density for the battery system may be significantly increased. Also such increased gaps permit higher zinc loadings on the negative electrodes, which in turn means that substantial cost savings can be achieved through the reduction in the number of electrodes required to store an equivalent amount of electrical energy.

A unit cell electrolyte distribution manifold 32 is secured to the top section of each frame 20 such that electrolyte may be conveyed to feed tubes (not shown). Specifically, the nipples 34 extending from the top of the frame members are inserted through holes in the bottom tray 36 of the manifold 32. These nipples 34 are then welded to the bottom tray 36 to provide a leak-proof connection. In order that each unit cell may be separately sealed, a plastic tray 44 as shown in FIG. 1 is welded or otherwise secured to the bus bar frame 20 in a fluid tight connection. A return path for the electrolyte supplied to each of the unit cells is provided by the discharge serpentine channel 50 which forms part of the top plate 52. The top plate 52 is welded to the top sections of the adjacent bus bar frames 20 to provide a closed or hydraulically sealed submodule.

The frame member 20 (as well as the other plastic components described) may be constructed from any suitable electrically nonconductive material which is chemically resistant or inert to the electrolyte and other chemical entities with which they will come into contact. While it is preferred that the frame member 20 be constructed from General Tire and Rubber Corp. Boltaron ® polvinylchloride or B. F. Goodrich Corp. Geon ® Polyvinyl-chloride, other suitable plastic materials may be employed such as Penwalt Kynar ® (polyvinylidene fluoride) or any of the other appropriate materials described in Section 33 of The Development of the Zinc Chloride Battery For Utility Applications, April 1979 report identified earlier.

The chlorine termination comb assembly is similar in construction to the intermediate comb assembly except that the chlorine termination comb assembly is not provided with a plurality of negative electrodes along one face of the bus bar. However, the chlorine termination comb assembly includes a plurality of electrical terminals mounted to the bus bar 18 to facilitate external electrical connections to the submodule 10. The zinc termination comb assembly simply comprises a bus bar whose edges and external face are enclosed in a plastic frame and a plurality of negative electrodes attached on the internal face thereof.

When assembled, the submodule 10 includes a plurality of "unit" cells connected electrically in series. Each of these unit cells comprise a number of single cells (i.e., a positive electrode and an opposing negative electrode) connected electrically in parallel. In an assembled state, the positive electrode structures of the intermediate comb assembly will be interdigitated with the negative electrodes of the zinc termination comb assembly, and the negative electrodes of the intermediate comb assembly will be interdigitated with the positive electrode structures of the chloride termination comb assembly. Accordingly, the positive electrode structures of the intermediate comb assembly and the negative electrodes of the zinc termination comb assembly will form one unit cell, and the negative electrodes of the intermediate comb assembly and the positive electrode structures of the next intermediate comb assembly will form another unit cell of the submodule 10.

Each cell comprises dense graphite zinc-electrode substrates and porous-graphite chlorine-electrode assemblies press fit into opposite sides of the slotted dense-graphite bus bar 18. Preferably, each unit cell incorporates 22 chlorine-electrode assemblies and 23 zinc-electrode substrates with an apparent electrode area of 2750 cm$^2$. Each unit cell is closed on all four sides with the unicell tray 44, the top plate 52, and two side plates 46.

Electrolyte will collect in the serpentine channel 50 as it overflows over the electrodes and exit from an outlet port 55 formed in each top plate 52. This serpentine channel arrangement provides electrical isolation on the return side of the electrolyte distribution system.

The positive or "chlorine" electrode member includes two planar opposing faces which each provide a reaction surface for electrochemical electron-transfer reactions of the same polarity. The "chlorine" electrode member 24 may be characterized as a type of unipolar electrode which has two active surfaces for oxidizing or reducing an electrochemical species which is chlorine in the zinc-chloride battery system. During the charging of a zinc-chloride battery system, chloride ions are oxidized at the "chlorine" electrode to generate chlorine gas, while during discharge dissolved chlorine is reduced at this electrode.

The flow-through porous electrode structure is described in detail in Whittlesey et al., U.S. Pat. No. 4,518,664. Depending upon the particular electrochemical system in which it is employed, the electrode member 24 may be constructed from any suitable electrically conductive material which is both electrochemically active and chemically resistant or inert to the electrolyte and other chemical entities with which it will come into contact. In the zinc-chloride battery system, it is preferred that the electrode member 24 be constructed from a porous graphite, such as Union Carbide Corp. PG-60 graphite or Airco Speer 37-G graphite. However, it should be appreciated that other graphites and electrically conductive porous materials may be employed, such as ruthenized titanium.

The "negative" electrode structures each comprise a single electrode member adapted to have a polarity opposing that of the electrode structures 24. In the zinc-chloride battery system, the electrode structures each are constructed from a dense or fine grained graphite which is generally both liquid and gas impermeable, such as Union Carbide Corp. CS grade graphite. The bus member 18 is also comprised of a dense or fine grain graphite which has been preferably coated with a nonconductive material or otherwise masked from participating in any electrochemical reactions.

FIGS. 2 and 3 illustrate the reinforced PVC encapsulation of the dense-graphite bus bar 18. The present invention contemplates the use of one or more vertical straps which are spaced along one or both faces of the bus bar. The elongated straps 21 may be formed at the same time as the frame 20, preferably by injection molding the frame and straps directly onto the bus member 18. In the preferred form of the invention illustrated in FIG. 2, it will be appreciated that the straps 21 extend between the top section 56 and the bottom section 58 of the frame 20, so as to connect the top and bottom sections of the frame together at various locations along the length of the bus bar.

As is most readily visible in FIG. 3, the PVC encapsulating frame is molded onto the graphite bus bar which contains notches 30 for the zinc electrodes, notches 26 for the chloride electrodes and semicircular grooves 54 for the straps. It will be appreciated that the grooves 54 enable the straps to be molded flush to the faces of the bus bars. It will also be appreciated that the grooves 54 are generally disposed in parallel alignment with the electrode notches 26 and 30. Additionally, while the grooves 54 are shown to be semicircular in shape, other suitable shapes can be used in the appropriate application. The graphite bus bar also has a contoured edge contained grooves 22 to provide a more secure PVC/graphite joint, as the PVC will conform to the shaped edge of the bus bar during the molding process. The particular arrangement and spacing of straps 21 will, of course, affect the amount of support reinforcement supplied by the frame structure. Although placement of the strap grooves 54 is limited by the required spacing of the grooves 26 and 30 for electrodes, it is preferred that the greatest concentration of straps 21 should occur near the center of the bus member 18. Thus, in the embodiment shown in FIG. 2, six straps 21 are shown across one face of the bus bar 18, yet four of these six straps are concentrated toward the center of the bus bar. It is also preferred that the straps 21 be completely disposed in the grooves 54, so that the straps will not extend beyond the face of the bus bars 18. With this flush mounting, it should be appreciated that the straps 21 will not affect the cell geometry of the unit cell assemblies. It should also be noted that when the straps 21 are provided on both sides of the bus bar 18, as shown in FIG. 3, it is preferred that the straps on each side be in general alignment with each other within the spacing requirements of the electrode notches 26 and 30.

As an additional technique of reinforcing the assembled bus bar 18 and frame 20, the top section 56 and the bottom section 58 of the frame 20 could be welded to adjacent plastic structures of the unit cell in the appropriate application. However, it should be noted that this technique may provide for a more rigid submodule assembly than the use of one or more straps as described above.

It will be appreciated that the above disclosed embodiment is well calculated to achieve the aforementioned objects of the present invention. In addition, it is evident that those skilled in the art, once given the benefit of the foregoing disclosure, may now make modifications of the specific embodiment described herein without departing from the spirit of the present invention. Such modifications are to be considered within the scope of the present invention which is limited solely by the scope and spirit of the appended claims.

What is claimed is:

1. An intermediate bus assembly for a battery system comprising:
   an electrically conductive bus member having a pair of generally flat opposing faces,
   an electrically non-conductive frame molded around the periphery of said bus member; and
   strap means integrally formed with said frame for reinforcing the edges of said bus assembly, said strap means comprises a plurality of elongated straps which connect two opposite sections of said frame and wherein said straps are spaced in parallel along the length of said bus member such that the greatest concentration of said straps occurs in the proximity of the center of said bus member.

2. The invention according to claim 1, wherein said frame and straps are made of plastic.

3. The invention according to claim 1, wherein said straps are at least partially disposed within grooves formed in said bus member.

4. The invention according to claim 3, wherein said straps are completely disposed within said grooves.

5. The invention according to claim 1, wherein said straps are disposed on both sides of said bus member.

6. The invention according to claim 5, wherein at least three straps are disposed on each side of said bus member.

7. The invention according to claim 1, wherein both sides of said bus member include a plurality of spaced notches, for mounting electrode members to each side of said bus member.

8. The invention according to claim 7, wherein said bus member is a generally flat bus bar.

9. The invention according to claim 8, wherein said bus member is made from relatively dense graphite.

10. The invention according to claim 1, wherein said bus member includes at least one grooved edge and said frame encapsulates and mechanically interlocks with said grooved edge.

11. A comb-type bipolar cell system for a battery system having a circulating electrolyte, comprising:
   at least one intermediate bus assembly, said intermediate bus assembly comprising a bus member having a first face and a second face opposing said first face, a frame molded around the periphery of said bus member, a plurality of generally parallel straps which are integrally formed with said frame to connect the top and bottom sections of said frame, and a plurality of spaced first and second electrodes extending from said first and said second face, respectively;
   a first terminal comb assembly comprising a terminal bus member and a plurality of spaced first electrodes extending from said terminal bus member, said first electrodes being interdigitated with said second electrodes of one of said intermediate bus assemblies;
   a second terminal comb assembly containing a terminal bus member and a plurality of spaced second electrodes, said second electrodes being interdigitated with said first electrodes of one of said intermediate bus assemblies; and
   a housing structure containing said intermediate bus assemblies and said terminal comb assemblies such that said cell system is hydraulically sealed and directly subjected to the operating pressure levels of said battery system.

12. An intermediate bus assembly for a zinc-chloride battery system comprising:
   a generally flat bus bar of relatively dense graphite having a pair of opposing faces and including at least one grooved edge;
   a plastic frame member structurally disposed around the periphery of said bus bar, said frame member encapsulating and mechanically interlocking with said grooved edge;
   a plurality of plastic straps integrally connected to said frame for reinforcing the edges of said bus bar, said straps extending between and connecting the top and bottom sections of said frame, and said straps being disposed at least partially within grooves formed in said bus bar;
   a plurality of uniformly spaced first electrode structures of relatively dense graphite extending from a first face of said bus bar, said first electrode structures being at least partially disposed within notches formed in said first face; and
   a plurality of uniformly spaced second electrode structures of relatively porous graphite extending from a second face of said bus bar opposing said first face, said second electrode structures being at least partially disposed within notches formed in said second face.

13. The invention according to claim 12, wherein said straps are spaced along the length of said bus bar such that the greatest concentration of straps occurs in the proximity of the center of said bus bar.

14. The invention according to claim 12, wherein said straps are formed on both opposing faces of said bus bar.

* * * * *